United States Patent
De Blasi

(10) Patent No.: US 8,196,782 B2
(45) Date of Patent: Jun. 12, 2012

(54) DEVICE FOR ICE CREAM DISTRIBUTOR IN COOLED WINDOWS AND SIMILAR

(76) Inventor: Franco De Blasi, Fano (IT)

(*) Notice: Subject to any disclaimer, the term of this patent is extended or adjusted under 35 U.S.C. 154(b) by 623 days.

(21) Appl. No.: 12/301,765

(22) PCT Filed: May 24, 2007

(86) PCT No.: PCT/IB2007/001369
§ 371 (c)(1),
(2), (4) Date: Jul. 28, 2009

(87) PCT Pub. No.: WO2007/138432
PCT Pub. Date: Dec. 6, 2007

(65) Prior Publication Data
US 2009/0294482 A1   Dec. 3, 2009

(30) Foreign Application Priority Data
May 25, 2006   (IT) ................ PS2006A0016

(51) Int. Cl.
*B67D 7/58*   (2010.01)
(52) U.S. Cl. ....... 222/372; 222/63; 222/146.6; 222/333; 222/334; 222/375; 222/386.5; 222/571
(58) Field of Classification Search ............ 222/372, 222/375, 333–334, 146.6, 386, 386.5, 389, 222/380, 361, 509, 518, 559, 154–156, 571, 222/52, 63, 340; 62/389, 337
See application file for complete search history.

(56) References Cited

U.S. PATENT DOCUMENTS

| | | | | |
|---|---|---|---|---|
| 1,449,534 A | * | 3/1923 | Morgan | 417/552 |
| 2,074,041 A | * | 3/1937 | Baldwin | 222/444 |
| 2,464,030 A | * | 3/1949 | Engstrom | 222/309 |
| 2,510,576 A | * | 6/1950 | Herbold | 222/309 |
| 4,105,146 A | * | 8/1978 | Broillard | 222/383.1 |
| 4,580,905 A | * | 4/1986 | Schwitters et al. | 366/149 |

(Continued)

FOREIGN PATENT DOCUMENTS
GB       906 038      9/1962
(Continued)

OTHER PUBLICATIONS
PCT International Search Report for PCT/IB2007/001369 filed on May 25, 2007 in the name of Franco De Blasi.
(Continued)

*Primary Examiner* — Frederick C. Nicolas
(74) *Attorney, Agent, or Firm* — Steinfl & Bruno, LLP

(57) ABSTRACT

Device for ice cream distributor in cooled windows and similar, fit to prevent the ice cream melting in the outlet area comprises at least a duct with an outlet hole and control element of the ice cream flow. In the outlet duct (2) is inserted a piston (5) with a stem (6), or similar, which, at distributing position, is placed beyond the outlet hole (3) through which the ice cream exits. while, at rest position, is placed before the outlet hole (3), in such a way to block the ice cream exit. During the return motion, the piston (5) brings back the ice cream already in the duct into the inner portion of the cooled space, delimited by the dividing wall (4), or in same container (1), in such a way to avoid the ice cream melting at the end portion.

12 Claims, 5 Drawing Sheets

U.S. PATENT DOCUMENTS

| | | | | |
|---|---|---|---|---|
| 4,742,941 A * | 5/1988 | Tastet | | 222/309 |
| 5,492,249 A * | 2/1996 | Beach | | 222/96 |
| 5,494,194 A * | 2/1996 | Topper et al. | | 222/146.6 |
| 5,556,268 A * | 9/1996 | Topper et al. | | 417/553 |
| 5,799,832 A * | 9/1998 | Mayo | | 222/135 |
| 5,816,455 A * | 10/1998 | Alpers et al. | | 222/388 |
| 5,823,397 A * | 10/1998 | Gil | | 222/181.3 |
| 6,105,820 A * | 8/2000 | McGill | | 222/95 |
| 6,182,862 B1 | 2/2001 | McGill | | |
| 6,299,025 B1 * | 10/2001 | Watanabe et al. | | 222/146.6 |

FOREIGN PATENT DOCUMENTS

| | | |
|---|---|---|
| IT | 01247116 | 12/1994 |
| WO | 00/64770 | 11/2000 |
| WO | 2006/040655 | 4/2006 |

OTHER PUBLICATIONS

PCT Written Opinion for PCT/IB2007/001369 filed on May 25, 2007 in the name of Franco De Blasi.

* cited by examiner

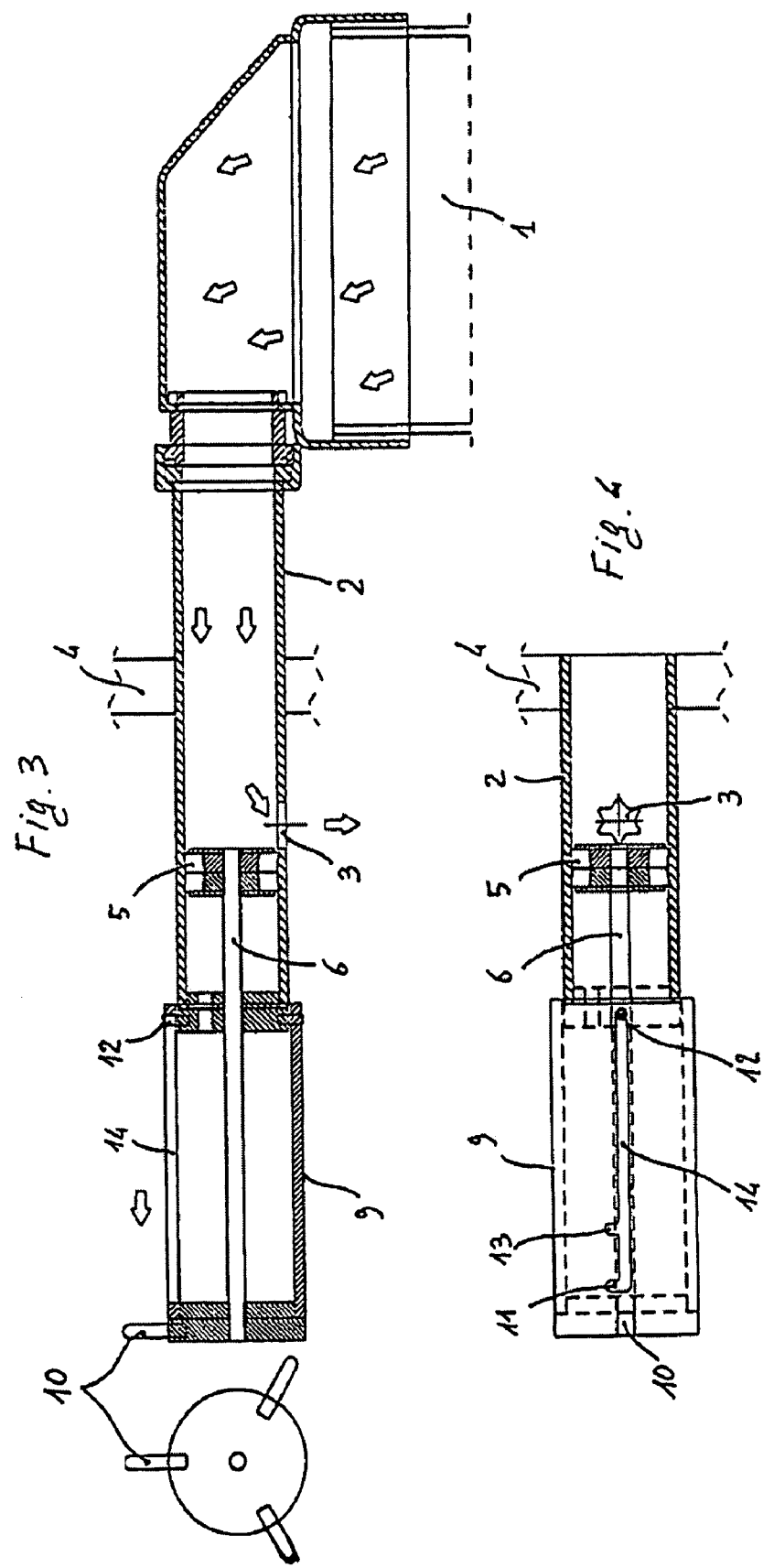

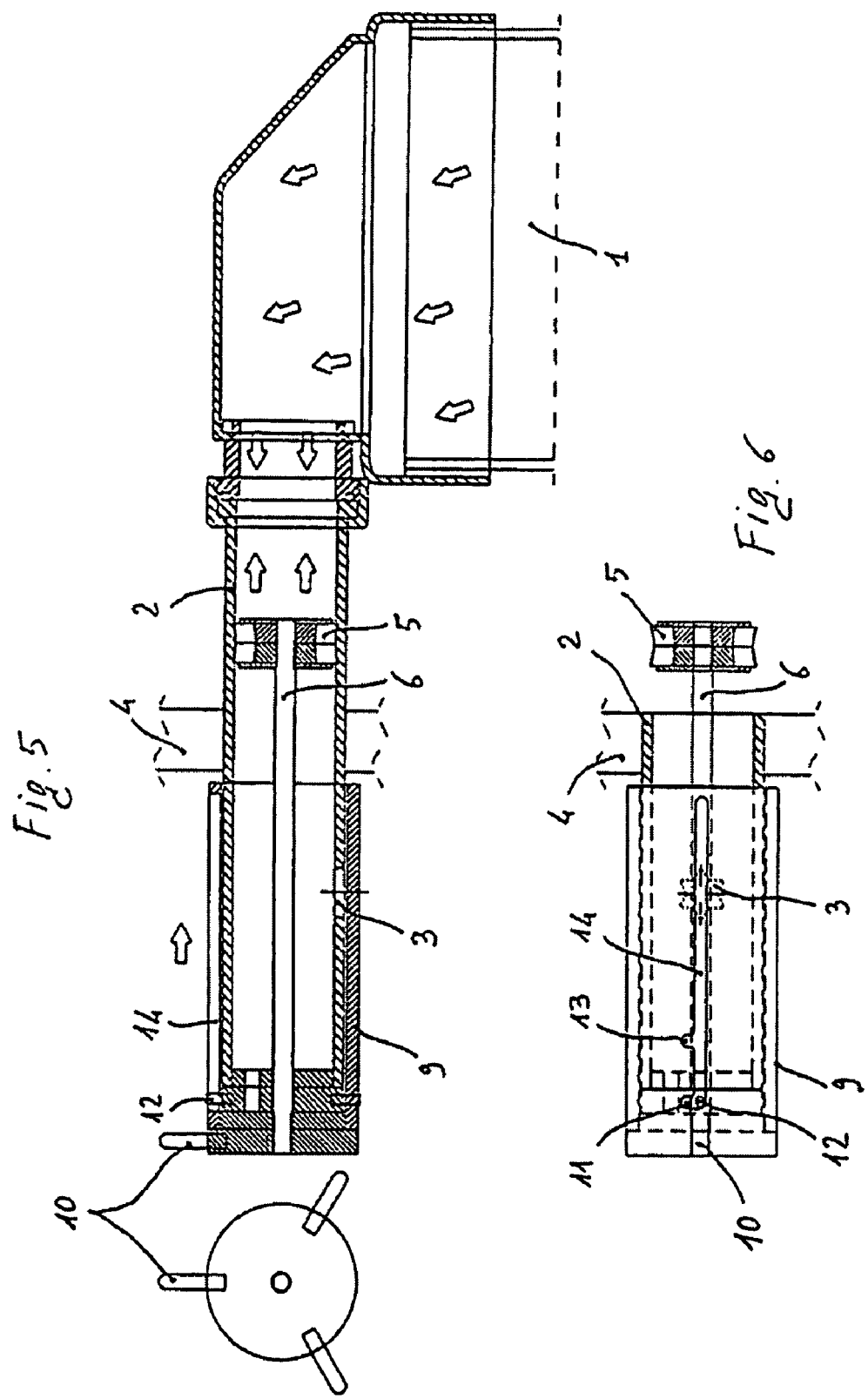

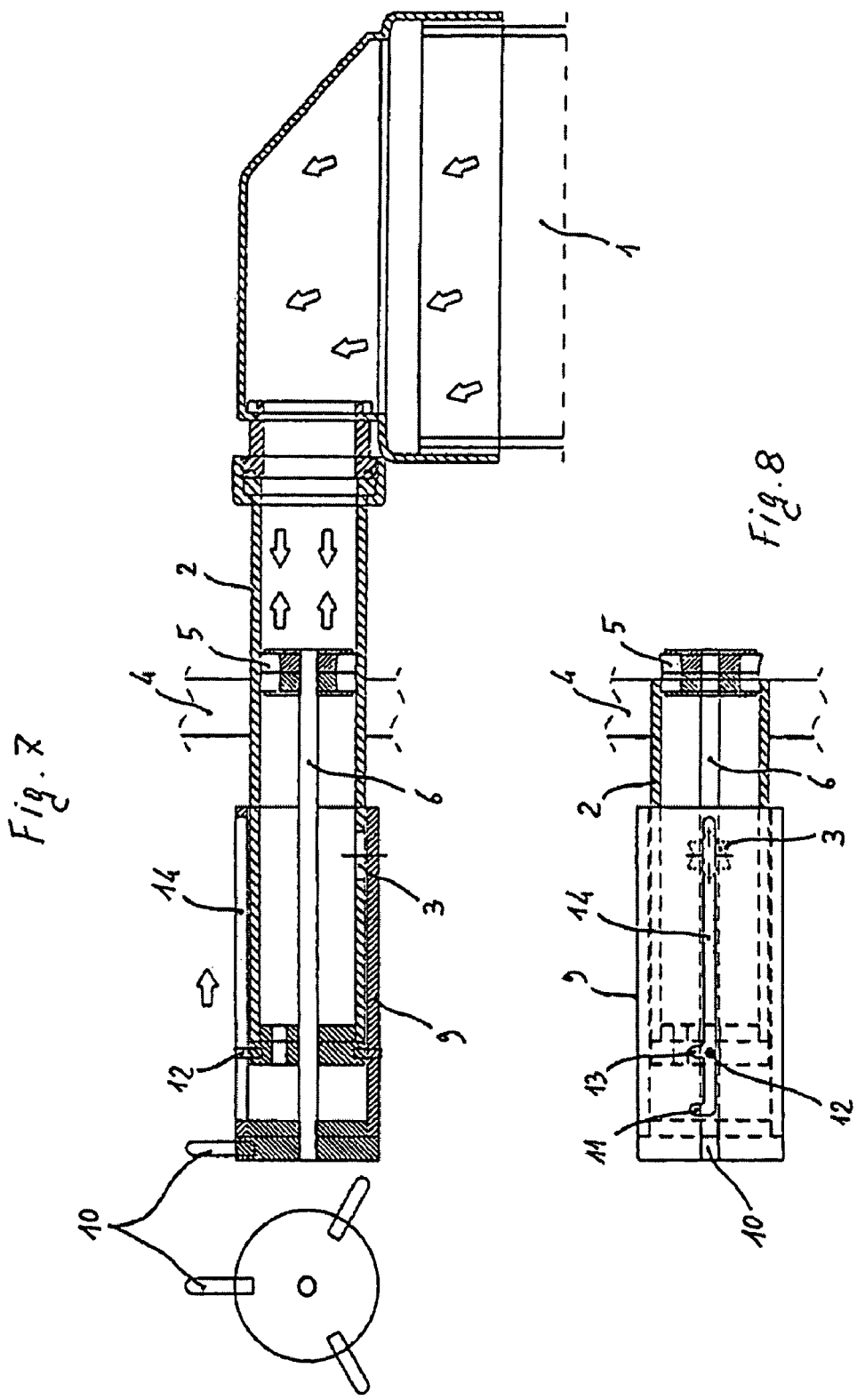

DEVICE FOR ICE CREAM DISTRIBUTOR IN COOLED WINDOWS AND SIMILAR

CROSS REFERENCE TO RELATED APPLICATIONS

This application is the national phase of International Application PCT/IB2007/001369 filed on May 24, 2007 which, in turn, claims priority to Italian Patent Application PS2006A000016 filed on May 25, 2006.

TECHNICAL FIELD

The present invention refers to cooled windows for selling craft made or industrial ice cream and in particular refers to a device fit to prevent the ice-cream melting at the nozzle end.

BACKGROUND ART

In known ice-cream cooled windows the different ice-cream tastes are contained in small basins accessible by the operator, which, by means of a small shovel, takes the varieties chosen by customers. The small basins are kept at low temperature by means of a cooling group placed in the windows base, or outside thereof. Generally illumination, heating and/or ventilation means of the glass are provided, in order to avoid the formation of condensates with consequent misting.

In previous patent applications of the same applicant, cooled windows have been disclosed having closed containers for several semi-liquid ice-cream tastes, with expulsion and delivering means for dispensing desired ice-cream, which is not handled directly by the operator. In such a manner, thermal dispersions through the basin access opening are avoided, the ice cream is maintained in sterile environment and the service is speed-up. In order to avoid the ice-cream melting at the end portion of the nozzle, at rest position the distributor must be housed inside the cooled room. For delivering the ice cream, the nozzle must be moved, at least partially, outside the cooled room.

DISCLOSURE OF THE INVENTION

The objects of the present invention are to avoid the ice-cream melting at the distributor end, to speed-up the distribution and to simplify the device.

The above mentioned objects can be achieved in accordance with the content of the claims.

The distributor of the present invention is equipped with a sliding piston, or similar, placed in the outlet duct, which, at distributing position, allows the ice cream to reach the outlet hole, while, at rest position, bring again the ice cream already in the duct into an inner portion of the cooled space. In such a manner, the ice cream melting in the end portion is avoided.

The invention provides variants with mechanical and manual delivering operations.

In the first variant, the piston movement is due to a small auxiliary pneumatic cylinder, driven by the same pneumatic system used for ejecting the ice cream from the related container towards the distributor. Instead of the pneumatic cylinder, an electrical motor reducer may be used.

In the manual variant, the piston movement is due to a movable element, at the end equipped with a handle which can be activated by the operator. At rest position, notches avoid that the ice-cream ejection pressure moves outside the element.

The ice cream delivering can be manually controlled, or by means of a photoelectric cell or by means of a sensor fit to detect the presence of the ice cream cone, or of the ice cream collecting container.

BRIEF DESCRIPTION OF THE DRAWINGS

The features of the present invention are illustrated afterwards, with particular reference to the attached drawings, in which:

FIG. 3 shows a longitudinal section view of the distributor with manual driven device, at ice-crearm distributing position;

FIG. 4 shows the corresponding section top view of the distributor, with sectioned portion thereof;

FIG. 5 shows a longitudinal section view of the distributor with manual driven device, at rest position;

FIG. 6 shows the corresponding section top view of the distributor, with sectioned portion thereof;

FIG. 7 shows a longitudinal section view of the distributor with manual driven device, at stand-by position;

FIG. 8 shows the corresponding section top view of the distributor, with sectioned portion thereof.

BEST MODE OF CARRYING OUT THE INVENTION

Figure 1:
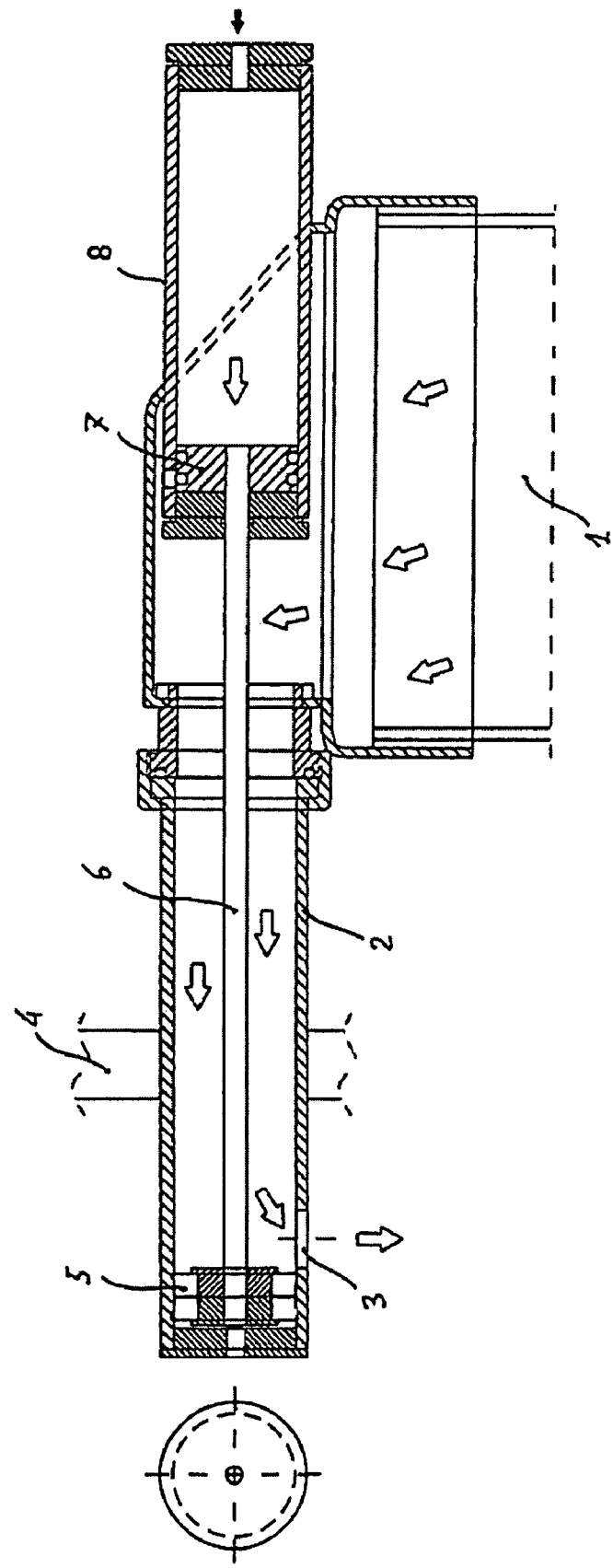
FIG. 1 shows a longitudinal section view of the distributor in the pneumatic driven version, at ice-cream distributing position.

With reference to above figures, numeral 1 indicates an ice cream container, which is pushed pneumatically, or by other means, inside the distributing duct 2, equipped with an outlet hole 3. The container 1 and part of the distributing duct 2 are contained in the window cooled space, delimited by the dividing wall 4 made of glass or other material. Numeral 5 indicates the sliding piston placed inside the duct 2, pneumatically or manually driven by means of the stem 6.

Figure 2:
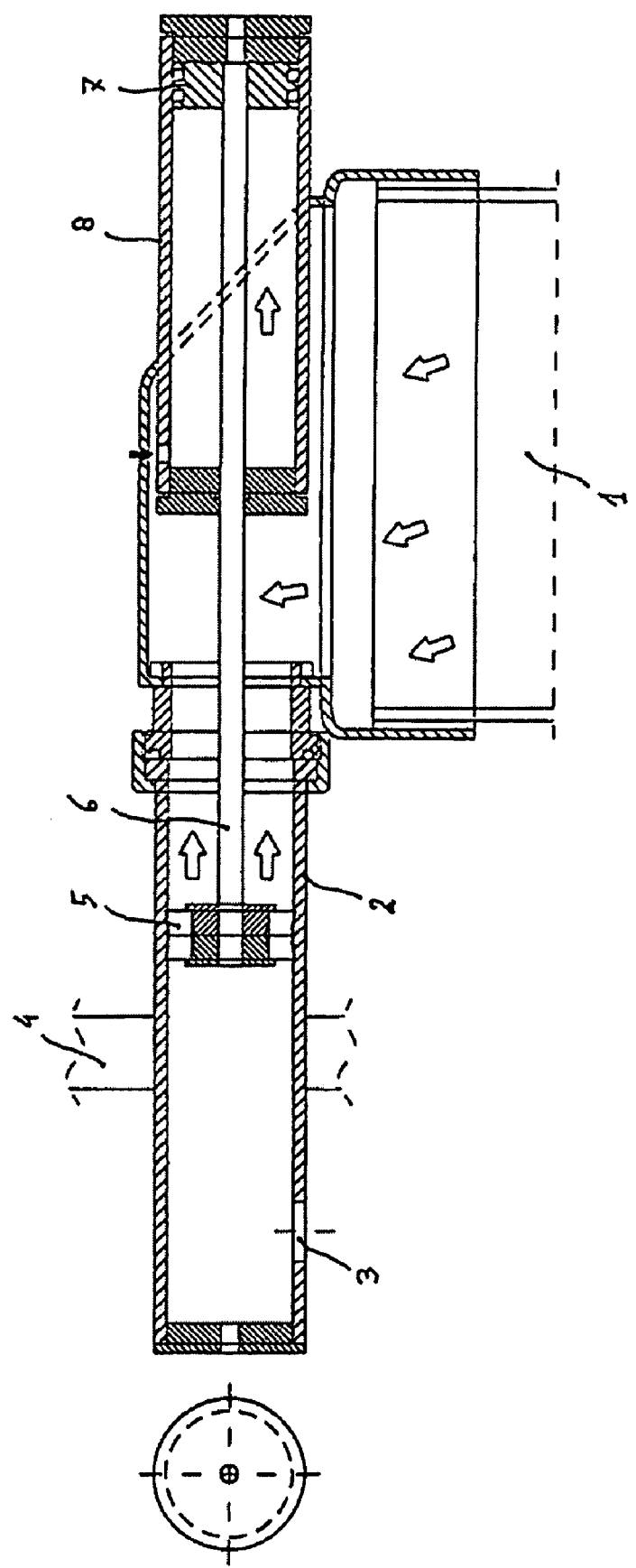
FIG. 2 shows a longitudinal section view of the pneumatic distributor at rest position.

In the pneumatically activated version, shown in FIGS. 1 and 2, the stem 6 is connected to the piston 7 of the pneumatic cylinder 8. Such auxiliary cylinder is activated with the same pneumatic system which pushes the ice cream from container 1 towards the distributor. In the position of FIG. 1 the piston 5 is beyond the outlet hole 3 and therefore the ice cream is distributed.

At the distribution end the piston 5 is translated into the position of FIG. 2 and therefore the remained ice cream in the duct is brought back into the cooled portion: so avoiding the ice-cream melting in the end portion. In the manually activated version, shown in FIGS. 3, 4, 5, 6, '7 and 8, the stem 6 of piston 5 is activated by the element 9.

Said element may be manually translated, acting on the handle 10, along the duct 2, coaxially placed thereto. In the position of FIGS. 3 and 4 the piston 5 is in a such position to let the ice cream passes towards the outlet hole 3.

At the distribution end the element 9 is pushed inside, in such a way to carry the piston 5 into the position of FIGS. 5 and 6. The ice cream remained in the duct is retract inside the cooled portion.

In order to maintain the piston 5 at such position, overcoming the ice cream pressure, the element 9 is equipped with a first stop notch 11 in which a pin 12 is engaged, when said element is slightly rotated.

During sliding of the sleeve, the pin 12 is inserted into the groove 14. In order to facilitate the operator, a middle stand-by position may be provided, as shown in FIGS. 7 and 8.

In such position the piston 5 is near a dividing wall 4 delimitating the cooled portion from the external one and so nearer to the distribution position.

In order to maintain such position a second notch 13 is provided, fit to house the pin 12, as shown in FIG. 8. Otherwise for long rest periods the rest position of FIGS. 5 and 6 is preferable, in which the ice cream is brought back more inside the cooled portion, or the container 1.

In particular to move manually the piston 5 a lever might be used, while a small motor-reducer might be used to move it mechanically.

The main advantages of the present invention are to avoid the ice cream melting at the distributor end, speeding up the distribution and simplifying the device.

The invention claimed is:

1. A device for ice cream distribution, comprising:
at least one outlet duct, the duct comprising an outlet hole for ice cream exit;
control means to control ice cream flow;
a duct piston with a stem inserted in the outlet duct, the stem having a distributing position and a rest position, wherein:
in the distributing position, the stem extends inside the outlet duct beyond the outlet hole,
in the rest position, the stem is retracted inside the outlet duct before the outlet hole to prevent the ice cream exit, and
during movement of the stem from the distributing position to the rest position, the ice cream already in the outlet duct is brought back to a cooled space to prevent ice cream melting.

2. The device of claim 1, further comprising:
a pneumatic cylinder for movement of the duct piston, the pneumatic cylinder comprising a cylinder piston, the cylinder piston being connected with the stem.

3. The device of claim 2, further comprising:
a pneumatic system for actuation of the duct piston and the cylinder piston.

4. The device of claim 1, further comprising:
an electrical motor adapted to actuate the duct piston.

5. The device of claim 1, further comprising:
a sliding element for movement of the duct piston.

6. The device of claim 5, wherein the sliding element comprises a handle, the handle being activatable by an operator.

7. The device of claim 5, wherein the sliding element is coaxial to the outlet duct.

8. The device of claim 7, further comprising a blocking pin, wherein the sliding element comprises a longitudinal groove provided with a first notch adapted to engage the blocking pin during rotation of the sliding element to prevent outward movement of the sliding element by ice cream ejection pressure at the rest position of the duct piston.

9. The device of claim 8, wherein the sliding element is further provided with a second notch, the second notch being adapted, in cooperation with the blocking pin, to block the duct piston in an intermediate position during the rotation of the sliding element.

10. The device of claim 1, further comprising a photoelectric cell or a sensor to control ice cream distribution by detecting presence of a cone or ice cream container.

11. The device of claim 1 wherein ice cream distribution is manually controlled.

12. The device of claim 1, wherein a portion of the outlet duct is contained inside a cooled window.

\* \* \* \* \*